US 9,411,806 B2

(12) United States Patent
Goyal et al.

(10) Patent No.: US 9,411,806 B2
(45) Date of Patent: *Aug. 9, 2016

(54) OPTIMIZING RELATIONAL DATABASE QUERIES WITH MULTI-TABLE PREDICATE EXPRESSIONS

(71) Applicant: International Business Machines Corporation, Armonk, NY (US)

(72) Inventors: Abhinav Goyal, Markham (CA); Wenbin Ma, Vaughn (CA); Nattavut Sutyanyong, Thornhill (CA); Calisto P. Zuzarte, Pickering (CA)

(73) Assignee: International Business Machines Corporation, Armonk, NY (US)

(*) Notice: Subject to any disclaimer, the term of this patent is extended or adjusted under 35 U.S.C. 154(b) by 228 days.

This patent is subject to a terminal disclaimer.

(21) Appl. No.: 14/270,419

(22) Filed: May 6, 2014

(65) Prior Publication Data

US 2015/0324426 A1    Nov. 12, 2015

(51) Int. Cl.
*G06F 17/30* (2006.01)

(52) U.S. Cl.
CPC .......... *G06F 17/30* (2013.01); *G06F 17/30141* (2013.01); *G06F 17/30339* (2013.01); *G06F 17/30404* (2013.01); *G06F 17/30442* (2013.01); *G06F 17/30454* (2013.01); *G06F 17/30864* (2013.01)

(58) Field of Classification Search
CPC ................................................ G06F 17/30442
See application file for complete search history.

(56) References Cited

U.S. PATENT DOCUMENTS

| | | | |
|---|---|---|---|
| 5,822,750 A * | 10/1998 | Jou ................... | G06F 17/30451 |
| 7,120,623 B2 | 10/2006 | Ganesan et al. | |
| 8,051,069 B2 | 11/2011 | Johnson et al. | |
| 2007/0219951 A1 * | 9/2007 | Ahmed ............. | G06F 17/30466 |

OTHER PUBLICATIONS

Appendix P—List of IBM Patents or Patent Applications Treated as Related.
U.S. Appl. No. 14/553,152 entitled "Optimizing Relational Database Queries With Multi-Table Predicate Expressions", filed Nov. 25, 2014.
Hellerstein, Joseph M., "Predicate Migration: Optimizing Queries with Expensive Predicates", Computer Science Division, EECS Department, University of California, Berkeley, CA 94720, Dec. 3, 1992, pp. 1-22.
IBM, "IBM DB2 10.5 with BLU Acceleration, the multiworkload database software for the era of big data, improves performance while helping to reduce storage costs", IBM United States Software Announcement 213-210, dated Apr. 23, 2013, Planned Availability Date, Jun. 14, 2013, pp. 1-38, Grace Period Disclosure.

(Continued)

*Primary Examiner* — Grace Park
(74) *Attorney, Agent, or Firm* — David B. Woycechowsky

(57) ABSTRACT

Responding to relational database queries (for example, SQL queries) in a new way. More specifically, qualifying queries are written (for example, written by a human individual) in a way so that a join operation precedes a row limiting operation. Notwithstanding the fact that the join operation precedes the row limiting operation, when responding to the query, machine logic (for example, software) performs the row limiting operation before the join operation. This can improve time and processing efficiency.

2 Claims, 4 Drawing Sheets

(56) References Cited

OTHER PUBLICATIONS

Pirahesh et al., "A Rule Engine for Query Transformation in Starburst and IBM DB2 C/S DBMS", pp. 391-400, 13th International Conference on Data Engineering, Apr. 7-11, 1997, © 1997 IEEE.

Vassilakis, Costas, "An Optimisation Scheme for Coalesce/Valid Time Selection Operator Sequences", University of Athens, Department of Informatics, SIGMOD Record, vol. 29, No. 1, Mar. 2000, pp. 38-43.

* cited by examiner

400a

| CUSTOMER | FLAVOR | CANDY |
|---|---|---|
| ABLE | HORSERADISH | GUM |
| BAKER | PEPPER | CANDY BAR |
| CHARLIE | BEEF | SOUR BALL |

| CUSTOMER | CUSTOMER NO. | CANDY |
|---|---|---|
| ABLE | 1 | $6.00 |
| BAKER | 2 | $7.00 |
| CHARLIE | 3 | $82.00 |

| CUSTOMER | FLAVOR | CANDY |
|---|---|---|
| ABLE | HORSERADISH | GUM |

| CUSTOMER | CUSTOMER NO. | BALANCE |
|---|---|---|
| ABLE | 1 | $6.00 |

| CUSTOMER | FLAVOR | CANDY | CUSTOMER NO. | BALANCE |
|---|---|---|---|---|
| ABLE | HORSERADISH | GUM | 1 | $6.00 |

OPTIMIZING RELATIONAL DATABASE QUERIES WITH MULTI-TABLE PREDICATE EXPRESSIONS

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

"IBM DB2 10.5 with BLU Acceleration, the multiworkload database software for the era of big data, improves performance while helping to reduce storage costs", IBM United States Software Announcement 213-210, dated Apr. 23, 2013, Planned Availability Date, Jun. 14, 2013, pp. 1-38.

BACKGROUND OF THE INVENTION

The present invention relates generally to the field of relational database, and more particularly to querying of relational databases. A relational table may be vertically divided to multiple tables and may share only the "key" column across the divided tables. This is a common practice for a relation representing an entity with extended sets of attributes. An example is a relation to store customer information. Commonly collected attributes such as name, address, and telephone numbers could be stored in a "main" table. Optional attributes then are stored in an "auxiliary" table sharing with the "main" table only the customer "id" column. Another application of this principle is storing each set of customer attributes collected from one source to one table. Here common columns other than the "id" column may be resolved using some application rules.

Predicate pushdown is a known technique in the field of responding to database queries written in query language, like SQL. In conventional predicate pushdown, a query includes a predicate that: (i) includes a join type operator (see definition below in Definitions sub-section of the Detailed Description section) that renders a scope of the first query to be inclusive of a plurality of tables, (ii) includes a row limiting operator (see definition below in Definitions sub-section of the Detailed Description section) that effectively excludes at least some of the rows of one of the tables of the plurality of tables, and (iii) is written so that the join type operation precedes the row limiting operator. Under conventional predicate pushdown, the foregoing type of query is responded to performing the following steps in the following order: (i) applying the row limiting operator to the single table, to which it applies, out of the plurality of tables such that the single table becomes a row limited table, and (ii) applying the join type operator to the plurality of tables (including the single table that was previously row limited in the previous step) to yield what will herein be referred to as a "row limited joined table.".

SUMMARY

According to an aspect of the present invention, there is a method, system and computer program product that performs the following steps (not necessarily in the following order): (i) receiving a first query, directed to a relational database and written in a query language, including a predicate that: (a) includes a first join type operator that renders a scope of the first query to be inclusive of a plurality of tables including a first table and a second table, (b) includes a first row limiting operator that renders the scope of the first query to be limited to less than all rows of the first table and less than all rows of the second table, and (c) is written so that the join type operation precedes the row limiting operator; and (ii) responding to the first query in a manner that includes: (a) applying the first row limiting operator to the plurality of tables to yield a plurality of row limited tables, and (b) applying the first join type operator to the plurality of row limited tables to yield a row limited joined table. The receipt of the first query and the response to the first query is performed by machine logic implemented by a computer.

BRIEF DESCRIPTION OF THE DRAWINGS

FIGS. 4A to 4D are tables generated in an example of use of the first embodiment method.

DETAILED DESCRIPTION

Figure 1:
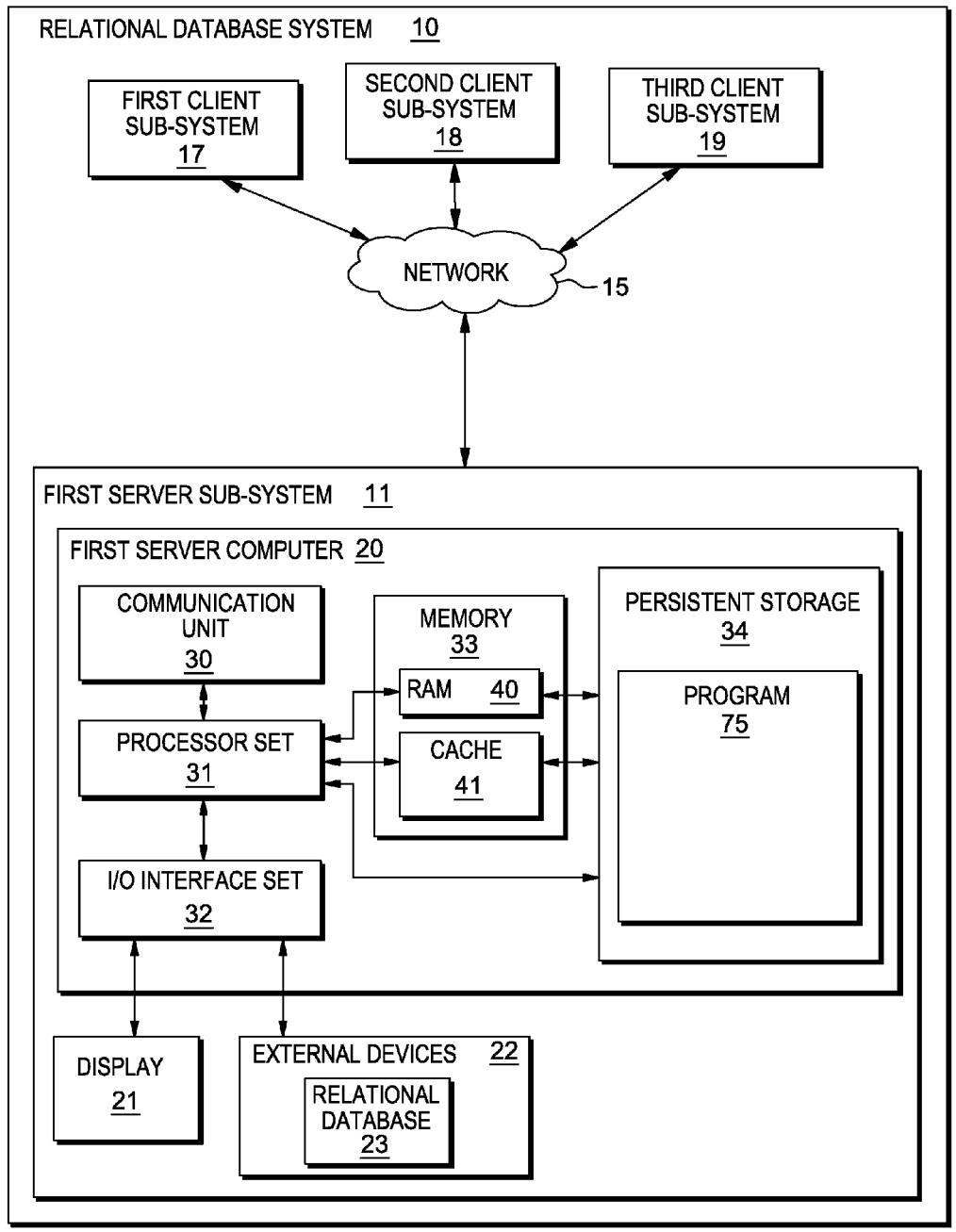
FIG. 1 is a schematic view of a first embodiment of a system according to the present invention.

Some embodiments are directed to a new form of predicate pushdown in database queries where multiple (that is, at least two) tables are "row limited" prior to being joined. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of relational database system 10, including: first server sub-system 11; client sub-systems 17, 18, 19; communication network 15; first server computer 20; communication unit 30; processor set 31; input/output (I/O) interface set 32; memory device 33; persistent storage device 34; display device 21; external device set 22 (including relational database 23); random access memory (RAM) devices 40; cache memory device 41; and program 75.

Sub-system 11 may be a laptop computer, tablet computer, netbook computer, personal computer (PC), a desktop computer, a personal digital assistant (PDA), a smart phone, or any programmable electronic device capable of communicating with the client sub-systems via network 15. Program 75 is a collection of machine readable instructions and/or data that is used to create, manage and control certain software functions that will be discussed in detail, below, in the Example Embodiment sub-section of this Detailed Description section.

Sub-system 11 is capable of communicating with other computer sub-systems via network 15. Network 15 can be, for example, a local area network (LAN), a wide area network (WAN) such as the Internet, or a combination of the two, and can include wired, wireless, or fiber optic connections. In general, network 15 can be any combination of connections and protocols that will support communications between server and client sub-systems.

Sub-system 11 is shown as a block diagram with many double arrows. These double arrows (no separate reference numerals) represent a communications fabric, which provides communications between various components of sub-system 11. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 33 and persistent storage 34 are computer-readable storage media. In general, memory 33 can include any suitable volatile or non-volatile computer-readable storage media. It is further noted that, now and/or in the near future: (i) external device(s) 22 may be able to supply, some or all, memory for sub-system 11; and/or (ii) devices external to sub-system 11 may be able to provide memory for sub-system 11.

Program 75 is stored in persistent storage 34 for access and/or execution by one or more of the respective computer processors 31, usually through one or more memories of memory 33. Persistent storage 34: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 34.

Program 75 may include both machine readable and performable instructions and/or substantive data (that is, the type of data stored in a database). In this particular embodiment, persistent storage 34 includes a magnetic hard disk drive. To name some possible variations, persistent storage 34 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 34 may also be removable. For example, a removable hard drive may be used for persistent storage 34. Other examples include optical and magnetic disks, thumb drives, and smart cards that are inserted into a drive for transfer onto another computer-readable storage medium that is also part of persistent storage 34.

Communications unit 30, in these examples, provides for communications with other data processing systems or devices external to sub-system 11. In these examples, communications unit 30 includes one or more network interface cards. Communications unit 30 may provide communications through the use of either or both physical and wireless communications links. Any software modules discussed herein may be downloaded to a persistent storage device (such as persistent storage device 34) through a communications unit (such as communications unit 30).

I/O interface set 32 allows for input and output of data with other devices that may be connected locally in data communication with server computer 20. For example, I/O interface set 32 provides a connection to external device set 22. External device set 22 will typically include devices such as a keyboard, keypad, a touch screen, and/or some other suitable input device. In system 10, external devices provide the massive amount of non-volatile data storage required to store relational database 23. External device set 22 can also include portable computer-readable storage media such as, for example, thumb drives, portable optical or magnetic disks, and memory cards. Software and data used to practice embodiments of the present invention, for example, program 75, can be stored on such portable computer-readable storage media. In these embodiments the relevant software may (or may not) be loaded, in whole or in part, onto persistent storage device 34 via I/O interface set 32. I/O interface set 32 also connects in data communication with display device 21.

Display device 21 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. EXAMPLE EMBODIMENT

Figure 2:
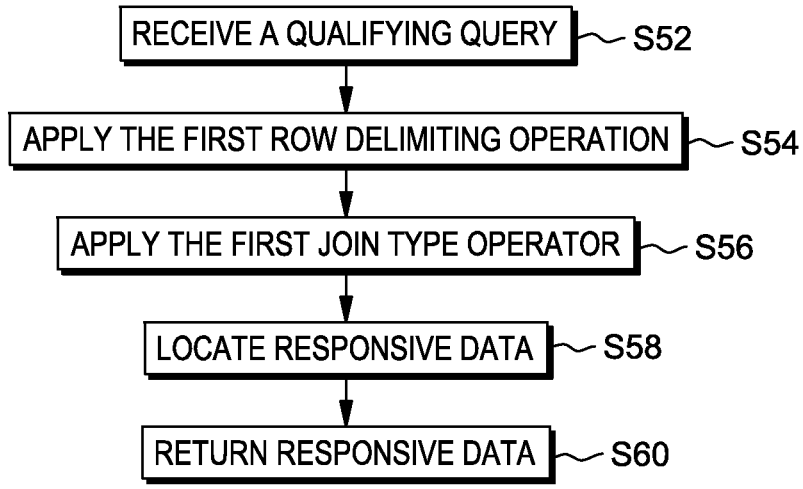
FIG. 2 is a flowchart showing a first embodiment of a method performed, at least in part, by the first embodiment system.
Figure 3:
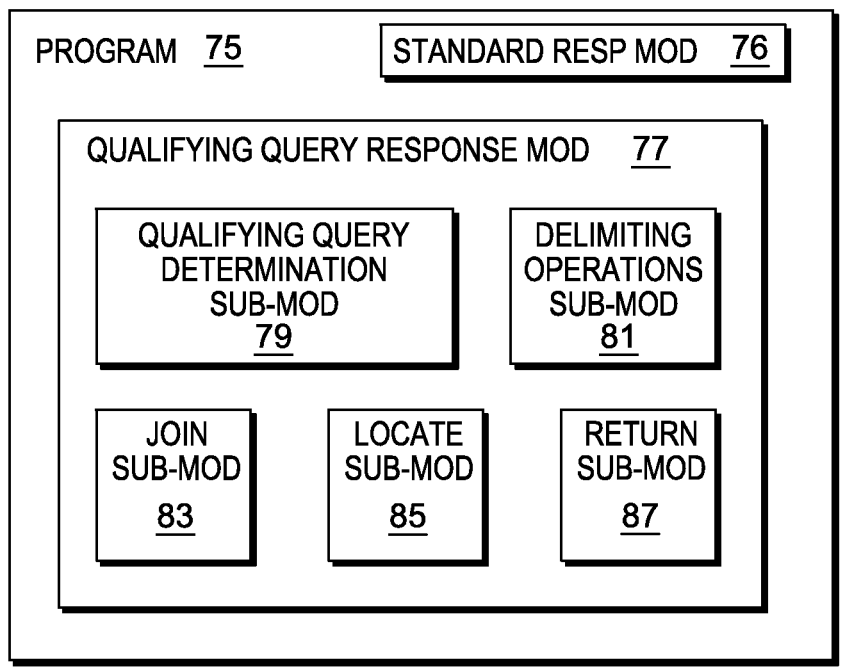
FIG. 3 is a schematic view of a machine logic (for example, software) portion of the first embodiment system.

FIG. 2 shows flowchart 50 depicting a method according to the present invention. FIG. 3 shows program 75 for performing at least some of the method steps of flowchart 50. This method and associated software will now be discussed, over the course of the following paragraphs, with extensive reference to FIG. 2 (for the method step blocks) and FIG. 3 (for the software blocks). More specifically: (i) standard response module ("mod") 76 of program 75 responds to relational database queries in the conventional way and will not be discussed in detail herein; but (ii) qualifying query response mod 77 responds to certain qualifying queries and will be the focus of the method of flowchart 50 and its related discussion, below.

Processing begins at step S52, where qualifying query determination sub-module ("sub-mod") 79 receives a query and determines that it is a qualifying query which will therefore be responded to by qualifying query response mod 77, rather than standard response module 76. More specifically, the query is received by sub-mod 79 from first client sub-system 17 through network 15 and communication unit 30 of first server computer 20 (see FIG. 1). This query is directed to relational database 23 (see FIG. 1) and is written in a query language (for example, SQL). The query is determined to be a qualifying query because it includes a predicate that: (i) includes at least one join type operator that renders a scope of the first query to be inclusive of multiple tables of the relational database, (ii) includes at least one row limiting operator that renders the scope of the first query to be limited to certain row(s) of the multiple tables indicated by the join operation(s), and (iii) is written so that at least one join type operation (herein called "the first join type operation" precedes at least one of the row limiting operators (herein called the first row limiting operator"). Unlike conventional predicate pushdown (see Background section, above), the row limiting operation limits rows in at least two tables of the multiple tables implicated by the query. The row limiting operation may apply to all of the multiple tables implicated by the query, but it also may apply to only some (that is, at least two) of the tables.

Some specific examples of these kinds of qualifying queries will be discussed in detail, below, in the Further Comments And/Or Embodiments sub-section of this Detailed Description section. This discussion will include information about specific operations that can be considered as row limiting operations and what types of specific operations can be considered as join type operations.

Processing proceeds to step S54, where delimiting operations sub-mod 81 applies the first row limiting operation. In this embodiment, if there are additional row limiting operations, then sub-mod 81 performs these at step S54 as well. Sub-mod 81 therefore handles the query out of the order that it was written to be performed. As will be discussed in detail, below, in the Further Comments And/Or Embodiments sub-section of this Detailed Description section, this does not compromise the accuracy of the response to the query. The Further Comments And/Or Embodiments sub-section of this Detailed Description section will also discuss several specific examples of row limiting operations which may be present in a given query. The application of the first row limiting operator to the multiple tables at step S54 yields what will herein be referred to as "row-limited tables." Because the row limiting operation applies to at least two tables, at least two of the row-limited tables will have fewer rows than the original tables upon which the row limited tables are respectively based.

An example of the performance of step S54 is shown in FIGS. 4A to 4C. In this example the query has a predicate which instructs that table 400a (see FIG. 4A) and table 400b (see FIG. 4B) be joined. But, instead of joining them as a first step, sub-mod 81 temporarily skips the join operation and instead performs a row limiting operation, also in the predicate of the query albeit after the join operator, and creates two corresponding row limited tables, collectively called 400c. In this example, the row limiter for both of tables 400a and 400b limits query consideration to the rows corresponding to customer Able.

Processing proceeds to step S56, where join sub-mod 83 applies the first join type operator to the tables identified in the query predicate. To the extent that an identified table has been row limited at step S54, it will be the row limited table which is used in the join type operation, rather than the full version of this table. This use of row limited tables when the join type operation is performed potentially results in much efficiency of processing time and/or processing resources. In this embodiment, if there are multiple join type operators in the query predicate, then all the join type operations are performed by sub-mod 83 at step S56. The application of the first join type operator to the tables (including at least one row limited table) yields a single table which is the union of the row limited tables which are now joined. This single table, resulting from the join type operation(s) will herein be referred to as a "row limited joined table."

An example of this is shown in FIG. 4D, where table 400d is the row limited joined table obtained by applying the join operation of the query predicate to the row limited tables of FIG. 4C, which were previously obtained at step S54.

Processing proceeds to step S58, where locate sub-mod 85 locates responsive data in the row limited joined table. Processing proceeds to step S60, where return sub-mod 87 returns the responsive data to a requestor. In this way, mod 77 responds to the first query by exploiting predicate pushdown to achieve early filtering.

A further, and perhaps more realistic, example of use of the method of flow chart 50 will now briefly be discussed. A query is received with a predicate that: (i) includes a join type operation joining two tables, Table 1 and Table 2; (ii) includes a row limiting operation; and (iii) the row limiting operation is subsequent to the join type operation. In this example, Table 1 is as follows:

| CID | NameFromSource1 | Address | Telephone |
|---|---|---|---|
| 1 | Able | 100 Rue A | 555-555-1234 |
| 2 | Bob | 76 B Street | 555-555-9876 |
| 3 | Charlie | 12 C Street West | 555-555-5432 |

In this example, Table 2 is as follows:

| CID | NameFromSource2 | Income_band |
|---|---|---|
| 2 | Robert | 30,001-45,000 |
| 3 | David | 50,001-65,000 |
| 4 | Edgar | 45,001-50,000 |

According to the method of flow chart 50, the row limiting operation is performed on each source table before the join type operation is performed. This yields row limited Tables 3 and 4, as follow:

| CID | NameFromSource1 | Address | Telephone |
|---|---|---|---|
| 2 | Bob | 76 B Street | 555-555-9876 |

| CID | NameFromSource2 | Income_band |
|---|---|---|
| 2 | Robert | 30,001-45,000 |

The join type operation is performed on row limited Tables 3 and 4 to yield row limited joined Table 5 as follows:

| CID | Name...1 | Address | Telephone | Name...2 | Income_band |
|---|---|---|---|---|---|
| 2 | Bob | 76 B Street | 555-555-9876 | Robert | 30,001-45,000 |

In the foregoing example, there may be an extension to the form of:

```
COALESCE( ... ) = <C>
to
COALESCE( ... ) IN <one_column_subquery>
and
COALESCE( ... ) = <scalar_subquery>
``` where <one_column_subquery> is a query returning a list of values and <scalar_subquery> returning one value. This can be written to:

```
WITH LIST(C) AS (<one_column_subquery> or <scalar_subquery>)
SELECT ...
FROM ...
WHERE COALESCE( ... ) = LIST.C
```

An example using the tables set forth above is as follows:

```
SELECT ...
FROM      4A <join> 4B ON 4A.CID=4B.CID
WHERE   COALESCE(4A.CID, 4B.CID) = (SELECT CID FROM
4A WHERE NameFromSource1 = 'Bob')
```

III. FURTHER COMMENTS AND/OR EMBODIMENTS

Some embodiments of the present invention recognize the following facts, potential problems and/or potential areas for improvement with respect to the current state of the art: (i) when the COALESCE expression (or similar expressions, such as CASE, OR predicates, etc.) reference more than one table, the software applies these predicates after the join; (ii)

as a result of operation described in the previous item, any filtering effect that these predicates may have is applied later and can result in significant processing only to filter out much of the join result; and/or (iii) this effect may be compounded with a larger number of tables involved.

Some embodiments of the present invention may include one, or more, of the following features, characteristics and/or advantages: (i) optimize the processing of SQL queries of joins and COALESCE( ) expressions; (ii) improve the performance of SQL queries, especially for queries against relatively large tables; (iii) exploit local column equivalence and NULL semantics of the predicate expressions; (iv) generate and push down "superset predicates" to filter rows before joins are made; and/or (v) exploit predicate pushdown in RDBMS (relational database systems) for the purpose of early filtering. The following code demonstrates the manner in which some embodiments of the present invention work:

```
SELECT       ...
FROM         A
             FULL OUTER JOIN B
             ON A1 = B1
             FULL OUTER JOIN C
             ON A1 = C1
WHERE        COALESCE(A1, B1, C1) = 1 /* P0 */
```

The above code is rewritten to the following:

```
SELECT   ...
FROM
         (SELECT ...
          FROM    (SELECT ... FROM A   WHERE A1 = 1)
                  FULL OUTER JOIN
                  (SELECT ... FROM B   WHERE B1 = 1)
                  ON A1 = B1
         ) /* Q1 */
         FULL OUTER JOIN
         (SELECT ... FROM C WHERE C1 = 1)
         ON A1 = C1
WHERE    COALESCE(A1, B1, C1) = 1 /* P0 */
```

As another example of code demonstrating an embodiment of the present invention:

```
SELECT       ...
FROM         A
             LEFT OUTER JOIN B
             ON A1 = B1
             LEFT OUTER JOIN C
             ON 1 = 1
WHERE        COALESCE(A1, B1, C1) = 1 /* P0 */
```

The above code is rewritten to the following:

```
SELECT   ...
FROM
         (SELECT ...
          FROM    (SELECT ... FROM A   WHERE COALESCE(A1,
                  1) = 1) LEFT OUTER JOIN
                  (SELECT ... FROM B   WHERE B1 = 1)
                  ON A1 = B1
         ) /* Q1 */
         LEFT OUTER JOIN C
         ON 1 = 1
WHERE    COALESCE(A1, B1, C1) = 1 /* P0 */
```

Some embodiments of the present invention enhance "predicate pushdown" by adding a superset predicate for COALESCE (or similar expressions) such that the predicate covers a subset of the tables and can be pushed down to the tables covering this subset. For example, in the context of outer joins, say T1 LEFT OUTER JOIN T2, the "row preserving side" is T1 (that is, the side where the rows coming into the outer join operator flow out along with values from T2 for rows that join or are padded with NULL when no rows in T2 match the join column value from T1). T2 is called the "NULL producing side" of the outer join. A full outer join has each side designated as a "row preserving side" and a "NULL producing side." Pushing down predicates through the NULL producing side of an outer join has restrictions from a semantic point of view because the value may change to a NULL as a result of the outer join operation.

Some embodiments of the present invention relate to a proof that the queries of the predicate form in the previous paragraph, over a view of vertically divided tables, can be optimized significantly. More specifically, these queries can be optimized by pushing a portion of the predicate to: (i) the underlying tables below the full outer join operator; (ii) the NULL producing side of the left outer join or right outer join operator; or (iii) the inner join operator. The outer join operators then only apply to a few qualified rows, resulting in a significant performance improvement. Some embodiments of the present invention involve equivalent forms of the aforementioned view, such as an in-line view, rewritten as: (i) part of the WITH keyword; or (ii) a Subselect placed after the FROM clause of an SQL statement.

A predicate of the form of COALESCE(<col1>, <col2>, <col3>, ... )=<constant> can be expressed by an alternative form being a superset predicate of the original COALESCE. The alternative form then can be applied as an early restriction if any subset of the <col> in the COALESCE appear in a join predicate before applying the COALESCE( ... )=<constant> predicate. The early restriction at the lower source of the data processing will reduce the amount of the data processing and hence improve the performance of the queries.

Other forms of predicates using CASE expression predicates or OR predicates involving multiple vertical tables, or expressing the COALESCE as a column in a SELECT clause or a view and use the column in a predicate of the form <col>=<constant> can be handled in a similar way.

To illustrate the order of the magnitude of the performance gain from this invention, let's assume a CUSTOMER view of 1 million customers is derived from two vertical divided tables satisfying the conditions outlined in this invention with the first table and the second table containing 800,000 and 600,000 rows respectively. The view that is processed without this optimization requires a join of 800,000 rows and 600,000 rows. The result from the view is then applied to the COALESCE(C1,C2)=<Cust_X> returning 1 customer record. When applying the optimization technique in this invention, the system evaluates the predicate C1=<Cust_X> on the first table and the predicate C2=<Cust_X> on the second table resulting on 1 row returned from each table. The system then evaluates the join between two 1-row tables and then applies the original COALESCE predicate. Not only that the volume of data is substantially less in the optimized version of the processing at the join but also the evaluation of the predicate Cn=<Cust_X> could exploit indexes on the tables to retrieve the qualified rows faster than the evaluation of the original COALESCE predicate on a 1-million row derived table from the result of the join.

Some embodiments of the present invention may include one, or more, of the following features, characteristics and/or advantages: (i) exploit local column equivalence in outer joins to be able to generate superset predicates that can be pushed down through outer joins; (ii) the outer join behavior with NULL and the NULL semantics of the predicate expressions is used in a method to help reduce the amount of data processed in the joins; (iii) can be easily implemented by anyone experienced in database query optimization and rewrite; and/or (iv) application programmers may also write the optimized query manually adding the pushed down superset predicates.

A rule called "Theorem 1," which corresponds to a reduction of arguments, will now be discussed. Theorem 1 states that a predicate P1:

coalesce($a,b,c, \ldots, x,y,z$)=<C>.

(where <C> is a single value) has the following superset (or redundant) predicates:

COALESCE($a,b,c, \ldots ,y,,z,$<C>) = <C>
COALESCE($a,b,c, \ldots ,y,$<C>) = <C>
...
COALESCE($a,b,c,$<C>) = <C>
COALESCE($a,b,$<C>) = <C>
COALESCE($a,$<C>) = <C>

Proof for Theorem 1 will now be discussed. Starting from the first element, there are three possibilities that depend upon the value of a as follows: (i) if a=<C> then the predicate [P1] is true; (ii) if a is NULL (which is equal to COALESCE(a, <C>)=<C>), then it depends on the value of the next element; and (iii) any values of a rather than <C> and NULL will result in the evaluation of [P1] as false. Similarly, if a is NULL, then b must have the value <C> or the value NULL for the predicate [P1] to be true. This can be expressed as COALESCE(a, b,<C>)=<C>.

A rule called "Theorem 2," which corresponds to transitivity via equality join predicate, will now be discussed. Consider the following:

| | | |
|---|---|---|
| SELECT | A.a, B.b, ... | |
| FROM | A <join> B | |
| ON | (A.a = B.b) | /* P0 */ |
| WHERE | COALESCE(A.a,<C>) = <C> | /* P1 */ |
| AND | COALESCE(A.a,B.b,<C>) = <C> | /* P2 */ |

When there is an equality join predicate (A.a=B.b), the predicate is susceptible to determination by inference as follows:

COALESCE($B.b,$<C>)=<C> where <join> can be INNER JOIN, LEFT OUTER JOIN, RIGHT OUTER JOIN, and FULL OUTER JOIN.

Proof for Theorem 2 will now be discussed. Considering the FULL OUTER JOIN, the rows that satisfy the predicate (COALESCE(A.a,<C>)=<C>) is when (A.a is NULL or A.a=<C>). The combination of values of A.a and B.b that satisfy the predicate (A.a=B.b) is as shown in Table 1:

| a | b |
|---|---|
| <C> | <C> |
| <C> | NULL |
| <C> | Any non-NULL values that is not <C> ... [1] |
| NULL | <C> |
| NULL | NULL |
| NULL | Any non-NULL values that is not <C> ... [2] |

The values in [1] is not a valid combination once the join predicate (A.a=B.b) is applied. The values in [2] is filter by the predicate [P2]. Therefore, the qualified values of B.b that satisfy the combined predicate P0, P1 and P2 are <C> and NULL. The same proof can be derived for LEFT OUTER JOIN, RIGHT OUTER JOIN, and INNER JOIN.

A rule called "Theorem 3" will now be discussed. Theorem 3 involves predicate push down. The following is Expression 5:

| | |
|---|---|
| SELECT | A.a, B.b, ... |
| FROM | A <join> B |
| ON | A.a = B.<col> |
| WHERE | COALESCE(A.a, <C>) = <C> |

The following is Expression 6:

```
WITH A(a, ...) AS
(
    SELECT A.a, ...
    FROM   A
    WHERE  COALESCE(A.a, <C>) = <C>
),
B(col, ...) AS
(
    SELECT B.col, ...
    FROM   B
    WHERE  COALESCE(B.<col>, <C>) = <C>
)
SELECT A.a, B.b, ...
FROM   A <join> B
ON     A.a = B.<col>
```

If <join> is FULL OUTER JOIN then Expressions 5 and 6 are equivalent. If <join> is LEFT OUTER JOIN, RIGHT OUTER JOIN, or INNER JOIN, the predicate on the null-producing side table can be reduced further from WHERE COALESCE(<col>, <C>)=<C> to WHERE <col>=<C>.

Proof for Theorem 3 will now be discussed. If A is the row-preserving side table, all the rows in A are preserved including the rows containing NULL value in the column a. The only values of a that are qualified by the original predicate after the join is <C> and NULL. Therefore, the same predicate can be applied to A before the join. If A is strictly the null-producing side table, the rows containing NULL value in the column a will be filtered by the equality join predicate a=b. Therefore, only the rows of the value <C> from A qualify the join predicate [a=b].

A rule called "Theorem 4" will now be discussed. Theorem 4 involves predicate push up. Expression 7 is as follows:

```
WITH A(a, ...) AS
(
    SELECT  A.a, ...
    FROM    A
    WHERE   COALESCE(A.a, <C>) = <C>
)
SELECT  A.a, B.b, ...
FROM    A <join> B
ON      (A.a = B.b)
```

Expression 8 is as follows:

```
WITH A(a, ...) AS
(
    SELECT  A.a, ...
    FROM    A
    WHERE   COALESCE(A.a, <C>) = <C> /* the lower predicate */
)
SELECT  A.a, B.b, ...
FROM    A <join> B
```

-continued

```
ON       (A.a = B.b)
WHERE    COALESCE(A.a, <C>) = <C> /* the upper predicate */
```

Expression 7 and 8 are equivalent per the proof set forth in the following paragraph.

If A is a row-preserving table of the <join>, such as FULL OUTER JOIN or LEFT OUTER JOIN, the predicate in the WITH clause (the lower predicate) restricts only the rows with the values of <C> and NULL. The <join> operation does not alter the values of the column a. The predicate in the main SELECT (the upper predicate) will also qualify when a=<C> or a is NULL. In other words, the upper predicate is an equivalent predicate to the lower predicate. On the other hand, if A is not a row-preserving table of the <join>, such as INNER JOIN or RIGHT OUTER JOIN, the lower predicate restricts the rows when a=<C> or a is NULL. The <join> operation filters all the rows when a is NULL, leaving only the rows when a=<C>. The upper predicate qualifies any rows when a=<C>. In other words, the upper predicate can be treated as a redundant predicate. Adding it does not change the result of the original SQL statement.

A rule called "Theorem 5" will now be discussed. Theorem 5 involves predicate simplification and push down. Expression 9 is as follows:

```
SELECT   A.a, B.b ...
FROM     A
         <join> B ON (A.a=B.b)
WHERE    COALESCE(A.a,B.b) = <C>    /* P1 */
AND      COALESCE(A.a,<C>) = <C>    /* P2 */
AND      COALESCE(B.b,<C>) = <C>    /* P3 */
```

Expression 10 is as follows:

```
WITH
A' AS
(
    SELECT   a, ...
    FROM     A
    WHERE    a = <C>
),
B' AS
(
    SELECT   b, ...
    FROM     B
    WHERE    b = <C>
)
SELECT   A'.a, B'.b ...
FROM     A'
         <join> B' ON ...
WHERE    COALESCE(A'.a,B'.b) = <C>    /* P1 */
```

If <join> is FULL OUTER JOIN, INNER JOIN, LEFT OUTER JOIN and RIGHT OUTER JOIN, then Expressions 9 and 10 are equivalent.

The proof for Theorem 5 will now be set forth. The combination of values (α,b) that satisfy the predicate P2 and P3 are given below in Table 2:

| a | b |
|---|---|
| <C> | <C> ... #1 |
| <C> | NULL ... #2 |
| NULL | <C> ... #3 |
| NULL | NULL ... #4 |

Row #4 is filtered by the predicate P1. Row #1 comes from table A when a=<C> and from table B when b=<C>. Row #2 comes from table A when a=<C> and there is no rows from table B with b=<C>. Likewise, Row #3 comes from table B when b=<C> and there is no rows from table A with a=<C>. As a result, we only need the rows from table A when a=<C> and the rows from table B when b=<C> to do the <join> operator.

Application(s) of the foregoing theorems will now be discussed. Application(s) of the theorems are illustrated through examples using SQL queries. Assume the following tables:
CREATE TABLE A(A1 INT, A2 INT, A3 INT);
CREATE TABLE B(B1 INT, B2 INT, B3 INT);
CREATE TABLE C(C1 INT, C2 INT, C3 INT);
CREATE TABLE D(D1 INT, D2 INT, D3 INT);
CREATE TABLE E(E1 INT, E2 INT, E3 INT);

Example 1 will now be discussed. Assume queries in the following form:

```
SELECT   ...
FROM     A
         FULL OUTER JOIN B
         ON A1 = B1
         FULL OUTER JOIN C
         ON A1 = C1
WHERE    COALESCE(A1, B1, C1) = 1 /* P0 */
```

Starting from the first column A1 of the COALESCE(A1, B1, C1) expression in the predicate P1, the superset (redundant) predicate COALESCE(A1, 1)=1/*P1*/ is generated [theorem 1]. The redundant predicate COALESCE(A1, B1, 1)=1/*P2*/ is also generated [theorem 1]. The predicates P1 and P2 are then pushed down through the FULL OUTER JOIN to table C [Theorem 3]. This yields the following Expression 11:

```
SELECT   ...
FROM
    (SELECT   ...
     FROM     A
              FULL OUTER JOIN B
              ON A1 = B1
     WHERE    COALESCE(A1, 1) = 1         /* P1 */
     AND      COALESCE(A1, B1, 1) = 1     /*
    ) /* Q1 */
    FULL OUTER JOIN C
    ON A1 = C1
WHERE    COALESCE(A1, B1, C1) = 1 /* P0 */
```

Applying Theorem 2 to the query of Expression 11, a new predicate COALESCE(B1, 1)=1/*P3*/ is introduced from the transitivity of the predicate P1 through the join predicate A1=B1. The redundant predicate P2 is then dropped to yield Expression 12 as follows:

```
SELECT   ...
FROM
    (SELECT   ...
     FROM     A
              FULL OUTER JOIN B
              ON A1 = B1
     WHERE    COALESCE(A1, 1) = 1     /* P1 */
     AND      COALESCE(B1, 1) = 1     /* P3 */
    ) /* Q1 */
    FULL OUTER JOIN C
    ON A1 = C1
WHERE    COALESCE(A1, B1, C1) = 1 /* P0 */
```

Applying Theorem 4, the predicates P1 and P3 are pushed up to the upper join to yield Expression 13 as follows:

```
SELECT   ...
FROM
     (SELECT   ...
      FROM    A
              FULL OUTER JOIN B
              ON A1 = B1
     ) /* Q1 */
     FULL OUTER JOIN C
     ON A1 = C1
WHERE    COALESCE(A1, B1, C1) = 1 /* P0 */
AND      COALESCE(A1, 1) = 1        /* P1 */
AND      COALESCE(B1, 1) = 1        /* P3 */
```

Repeating the process again on the upper FULL OUTER JOIN, yields expression 14 as follows:

```
SELECT   ...
FROM
     (SELECT   ...
      FROM    A
              FULL OUTER JOIN B
              ON A1 = B1
     ) /* Q1 */
     FULL OUTER JOIN C
     ON A1 = C1
WHERE    COALESCE(A1, B1, C1) = 1 /* P0 */
AND      COALESCE(A1, 1) = 1        /* P1 */
AND      COALESCE(B1, 1) = 1        /* P3 */
AND      COALESCE(C1, 1) = 1        /* P5 */
```

The last step is to apply Theorem 5 and drop the redundant predicates, which yields Expression 15 as follows:

```
SELECT   ...
FROM
     (SELECT   ...
      FROM     (SELECT ... FROM A  WHERE A1 = 1)
              FULL OUTER JOIN
              (SELECT ... FROM B  WHERE B1 = 1)
              ON A1 = B1
     ) /* Q1 */
     FULL OUTER JOIN
     (SELECT ... FROM C WHERE C1 = 1)
     ON A1 = C1
WHERE    COALESCE(A1, B1, C1) = 1 /* P0 */
```

The result is the earlier filter of A1=1, B1=1 and C1=1 at the base tables that will save on the amount of required processing for the joins.

Example 2 will now be discussed. Assume queries in the following form:

```
SELECT   ...
     FROM A
     LEFT OUTER JOIN B
     ON A1 = B1
     LEFT OUTER JOIN C
     ON 1= 1
     WHERE    COALESCE(A1, B1, C1) = 1 /* P0 */
```

Starting from the first column A1 of the COALESCE(A1, B1, C1) expression in the predicate P1, the superset (redundant) predicate COALESCE(A1, 1)=1/*P1*/ is generated through use of Theorem 1. The redundant predicate COALESCE(A1, B1, 1)=1/*P2*/ is generated through use of Theorem 2. The predicates P1 and P2 are pushed down through the LEFT OUTER JOIN to table C by Theorem 3. This yields Expression 16 as follows:

```
SELECT   ...
FROM
     (SELECT   ...
      FROM    A
              LEFT OUTER JOIN B
              ON A1 = B1
      WHERE   COALESCE(A1, 1) = 1          /* P1 */
      AND     COALESCE(A1, B1, 1) = 1      /* P2 */
     ) /* Q1 */
     LEFT OUTER JOIN C
     ON 1=1
WHERE    COALESCE(A1, B1, C1) = 1 /* P0 */
```

Applying Theorem 2, a new predicate COALESCE(B1, 1)=1/*P3*/ is introduced from the transitivity of the predicate P1 through the join predicate A1=B1. Then redundant predicate P2 is dropped out to yield Expression 17:

```
SELECT   ...
FROM
     (SELECT   ...
      FROM    A
              LEFT OUTER JOIN B
              ON A1 = B1
      WHERE   COALESCE(A1, 1) = 1          /* P1 */
      AND     COALESCE(B1, 1) = 1          /* P3 */
     ) /* Q1 */
     LEFT OUTER JOIN C
     ON 1=1
WHERE    COALESCE(A1, B1, C1) = 1 /* P0 */
```

Applying the Theorem 3 on the non row-preserving side of the A INNER JOIN B, which is table B, reduces P3 to the following Expression 18:

```
SELECT   ...
FROM
     (SELECT   ...
      FROM    (SELECT ... FROM A  WHERE COALESCE(A1, 1) = 1)
              LEFT OUTER JOIN
              (SELECT ... FROM B  WHERE B1 = 1)
              ON A1 = B1
     ) /* Q1 */
     LEFT OUTER JOIN C
     ON 1=1
WHERE    COALESCE(A1, B1, C1) = 1 /* P0 */
```

Because there is no equality predicate on the last argument of COALESCE, C1, no filtering predicate can be generated on table C and the process stops. If the SQL statement does not have the equality predicates on the full list of the columns in the COALESCE expression in the predicate above, it is still beneficial to have the early filter of all the leading columns appearing in equality join predicates in the form of COALESCE(<col>, <C>)=<C> where <C> represents a single value. This is demonstrated in Example 2 above.

Figure 5:
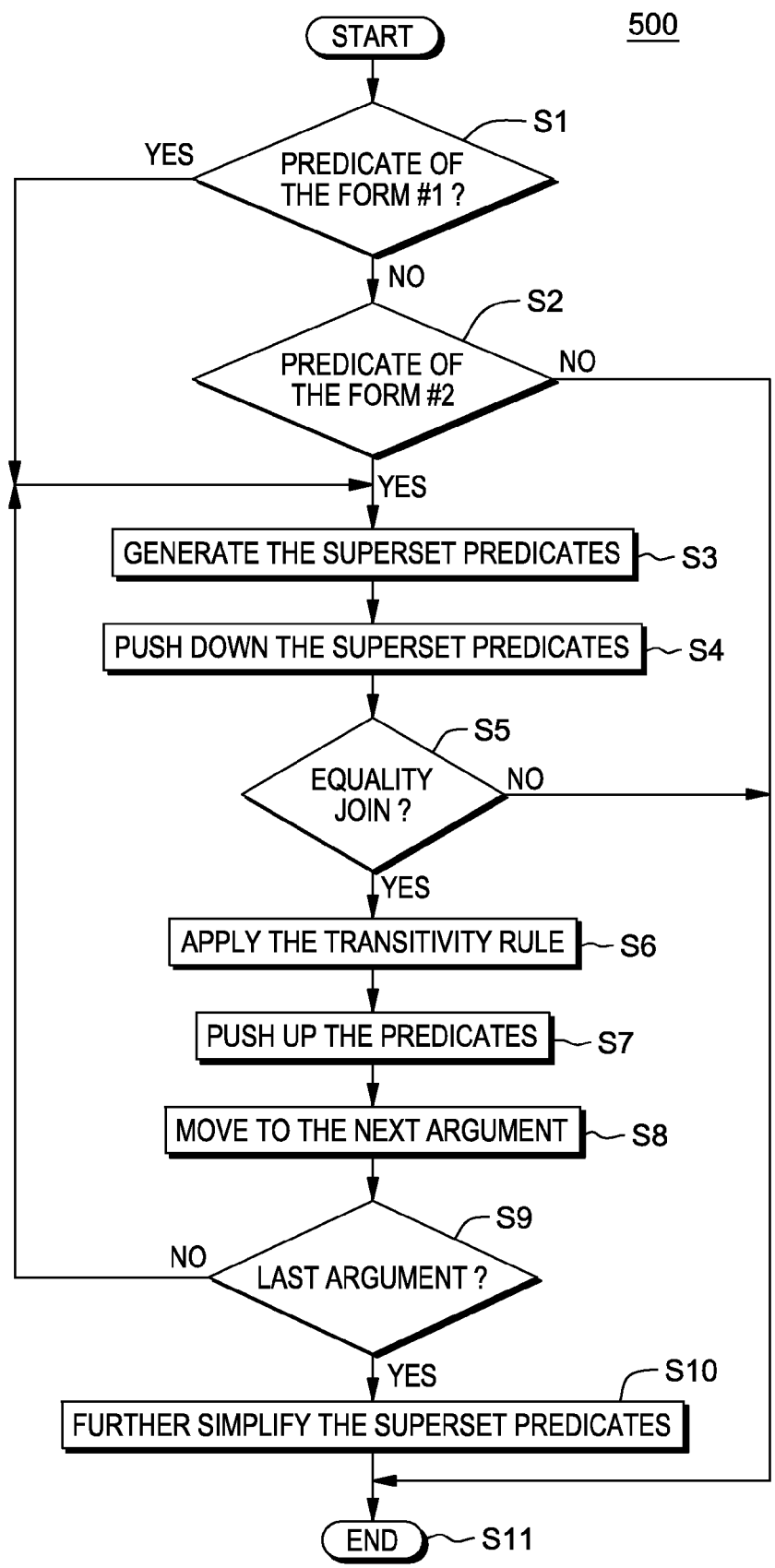
FIG. 5 is a flowchart showing a second embodiment of a method according to the present invention.

As shown in FIG. 5, flow chart 500 shows a method according to the present invention, including the following steps (with process flow as shown in FIG. 5): (START block, no reference numeral); (S1); (S2); (S3); (S4); (S5); (S6); (S7); (S8); (S9); (S10); and (S11). At least some of these steps will be discussed in more detail in the following paragraphs.

At step S1: Search for a predicate of the form COALESCE (a, b, c, ..., x, y, z)=<C> (or its equivalent alternate form of CASE expression, or, OR operator), where a, b, c, ..., y, z represent columns from the derived table the predicate is applied on and <C> represents a single value such as a constant. Go to (S3) if found, go to (S2) if not.

At Step S2: Search for a predicate of the form C=<C>, where C represents a column from the derived table the predicate is applied on, the column C is the result of an evaluation of the expression COALESCE(a, b, c . . . x, y, z) and <C> represents a single value such as a constant. Go to (S3) if found, stop the process if not.

At step S3: Use Theorem 1 to generate the superset predicate for the first argument and the next argument of the COALESCE, COALESCE(a,<C>)=<C> and COALESCE(a,b,<C>)=<C>.

At step S4: Use Theorem 3 to push down the predicates in (S3) to the lower operations.

At step S5: Test an equality join between the first argument, a, and the next argument b has been found. Process proceeds to step (S6) if found or stop the process if not.

At step S6: Use Theorem 2 to apply the transitivity rule to change the predicate COALESCE(a,b,<c>)=<C> to COALESCE(b,<C>)=<C> and Theorem 3 to push down the predicates and, if possible, simplify the predicate further if the output is a non row-preserving side of the join.

At step S7: Push up the predicates in (S6) to the upper operations.

At step S8: Move to the next argument of the original COALESCE predicate.

At step S9: Test if this is the last argument. If not, go to step (S3) and repeat the steps S3 to S9 again. If this is the last argument, go to step (S10).

At step S10: Further simplify the superset predicates generated by step (S6) if all the arguments of the original predicates are found by Theorem 5.

Alternate forms of COALESCE expression will now be discussed. The COALESCE expression can be expressed in two other equivalent forms. More specifically, COALESCE (a, b, c)=? is equivalent to:

(i) using a CASE expression as follows:

```
CASE WHEN a is null THEN
    CASE WHEN b is null THEN
        c
    ELSE
        b
    END
ELSE
    a
END = ?
``` or; (ii) using an OR operator as follows:
a=? OR (a is null and b=?) OR (a is null and b is null and c=?)
The proof, the application, and the process flow above are also applied to these two alternate forms of the COALESCE expression.

Some embodiments of the present invention may include one, or more, of the following features, characteristics and/or advantages: (i) applies to a coalesce function in the SQL language (note that this is not considered the same as, or similar to, a COALESCE operator specific to the temporal database area; and/or (ii) derives new predicates from the combination of a coalesce function and join predicates of the arguments of the coalesce function.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as may be being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Join type operation: includes, but is not necessarily limited to full joins, inner joins, left joins, right joins, and/or outer joins.

Row limiting operator/operation: includes, but is not necessarily limited to, query predicate language calling for a row selection operation, a row restriction operation, a COALESCE predicate, other forms of predicates using CASE expression predicates, OR predicates involving multiple vertical tables, and/or a COALESCE expression, a CASE expression or an OR predicate as a column in a SELECT clause that is used in a predicate later.

What is claimed is:

1. A computer program comprising a computer readable storage medium having stored thereon:

first program instructions programmed to receive a first query, directed to a relational database and written in a query language, including a predicate that: (i) includes a first join type operator that renders a scope of the first query to be inclusive of a plurality of tables including a first table and a second table, (ii) includes a first row limiting operator that renders the scope of the first query to be limited to less than all rows of the first table and less than all rows of the second table, and (iii) is written so that the join type operation precedes the row limiting operator; and second program instructions programmed to respond to the first query;

wherein:

the second program instructions include third program instructions programmed to apply the first row limiting operator to the plurality of tables to yield a plurality of row limited tables;

the second program instructions further include fourth program instructions programmed to apply the first join type operator to the plurality of row limited tables to yield a row limited joined table;

the second program instructions further include fifth program instructions programmed to locate responsive data in the row limited joined table;

the second program instructions further include sixth program instructions programmed to return the responsive data to a requestor;

the first query is written in Structured Query Language; and the response to the first query exploits: (i) superset predicates, (ii) predicate push down, (iii) transitivity rule, (iv) predicate push up, and (v) combinations of (i) to (iv) to achieve early filtering (or restriction).

2. A computer system comprising:

a processor(s) set; and a computer readable storage medium;

wherein:

the processor set is structured, located, connected and/or programmed to run program instructions stored on the computer readable storage medium; and the program instructions include:

first program instructions programmed to receive a first query, directed to a relational database and written in a query language, including a predicate that: (i) includes a first join type operator that renders a scope of the first query to be inclusive of a plurality of tables including a first table and a second table, (ii) includes a first row limiting operator that renders the scope of the first query to be limited to less than all rows of the first table and less than all rows of the second table, and (iii) is written so that the join type operation precedes the row limiting operator; and second program instructions programmed to respond to the first query;

wherein:

the second program instructions include third program instructions programmed to apply the first row limiting operator to the plurality of tables to yield a plurality of row limited tables;

the second program instructions further include fourth program instructions programmed to apply the first join type operator to the plurality of row limited tables to yield a row limited joined table;

the second program instructions further include fifth program instructions programmed to locate responsive data in the row limited joined table;

the second program instructions further include sixth program instructions programmed to return the responsive data to a requestor;

the first query is written in Structured Query Language; and the response to the first query exploits: (i) superset predicates, (ii) predicate push down, (iii) transitivity rule, (iv) predicate push up, and (v) combinations of (i) to (iv) to achieve early filtering (or restriction).

* * * * *